Figure 1:
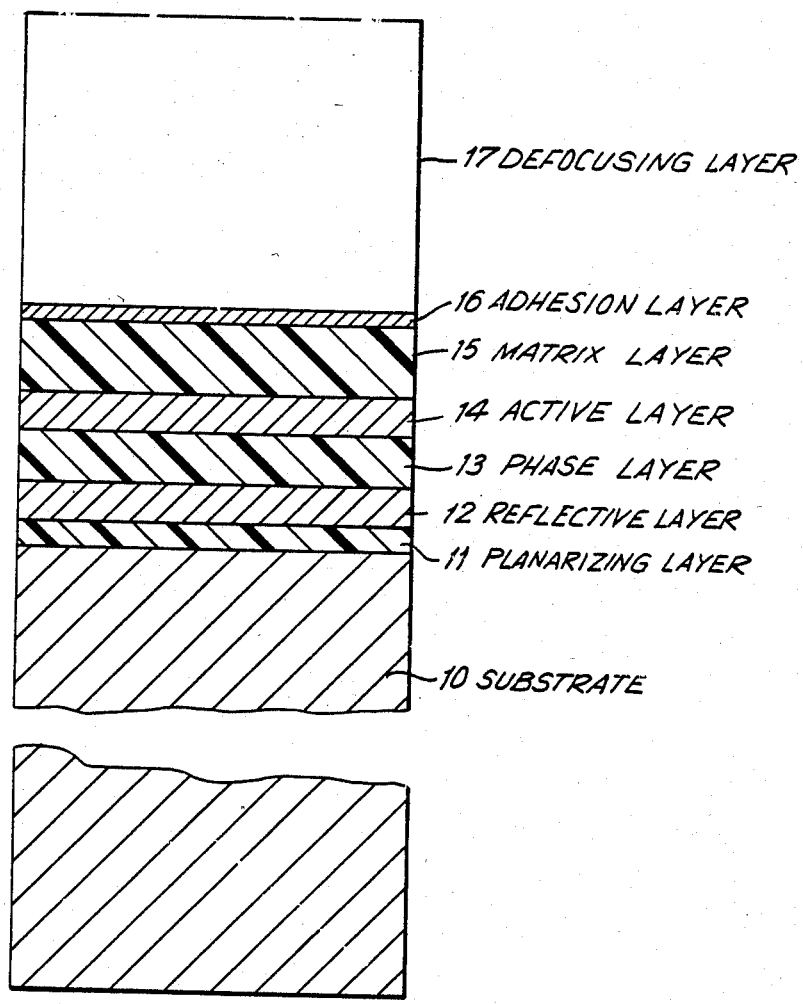

United States Patent [19]

Spong et al.

[11] Patent Number: 4,600,682

[45] Date of Patent: Jul. 15, 1986

[54] OPTICAL STORAGE STRUCTURE

[75] Inventors: Fred W. Spong; Boris J. Muchnik; Franklin D. Kalk, all of Boulder, Colo.

[73] Assignee: Storage Technology Corporation, Louisville, Colo.

[21] Appl. No.: 628,194

[22] Filed: Jul. 6, 1984

[51] Int. Cl.$^4$ .............................................. G11B 7/24
[52] U.S. Cl. ................................. 430/270; 346/135.1; 369/284; 369/286; 369/288; 428/461
[58] Field of Search ..................... 346/135.1; 369/284, 369/286, 288; 428/64, 65, 461; 430/945, 270

[56] References Cited

U.S. PATENT DOCUMENTS 4,370,391  1/1983  Mori et al. ...................... 428/702 X
4,397,923  8/1983  Yasuda et al. .................. 428/913 X
4,451,915  5/1984  LaBudde et al. ............ 346/135.1 X Primary Examiner—Alexander S. Thomas
Attorney, Agent, or Firm—Yuter, Rosen & Dainow

[57] ABSTRACT

A radiation recording structure for use in an information storage device having focused write and read radiation beams includes a substrate supported reflective layer, an active structure supported on the reflective layer. The structure also includes a dust defocusing layer as an outer surface for the structure for defocusing the image of dust on the outer surface and an aluminum adhesion layer between the dust defocusing layer and the active recording layer. The adhesion layer is transparent to the radiation beams and provides surface energy to draw the defocusing layer and the recording layer together.

9 Claims, 2 Drawing Figures

FIG. I

OPTICAL STORAGE STRUCTURE

This invention relates to optical storage devices of the type comprising a rotatable disk having an active structure enabling variation of optical properties by means of focused write radiation, such as a laser beam, and reading data stored thereon by means of focused read radiation.

An optical structure of the above type is disclosed, for example, in U.S. application Ser. No. 499,666, Muchnik, filed May 31, 1983, and copending application Ser. No. 628,697, filed July 6, 1984, both assigned to the present assignee. The present invention is directed to the provision of an optical recording structure of this type incorporating a rotatable substrate, and a layer for protecting the active layer and defocusing any dust particles that may inadvertently fall upon the structure.

Briefly stated, in accordance with the above disclosure, a preferably disk shaped substrate, for example, of aluminum or plastic, is provided with a planarizing layer, for example, a thin coat of acrylic material, to provide an optically smooth surface. A reflective layer for the structure is deposited on the planarizing layer, and thereupon the threelayer structure disclosed in U.S. application Ser. No. 499,666 is deposited. The phase layer, for example, of a fluorocarbon, is tuned, i.e., it has a thickness such that destructive interference occurs between radiation reflected from the active layer and radiation transmitted by the active layer and reflected from the reflective layer and transmitted by the active layer. This destructive interference phenomenon occurs for both read and write beams. It enhances the write sensitivity by increasing the coupling of the write beam energy to the active layer. It also enhances the read signal by increasing the reflectivity contrast between unwritten marks and unwritten surrounding regions.

In order to eliminate the effect of any dust or small particles falling on the structure, a dust defocusing layer is provided on the structure, being adhered thereto by an adhesion layer deposited on the matrix layer. The phase and matrix layers, and adhesion and dust defocusing layers are transparent to radiation of the read and write frequencies.

Figure 2:
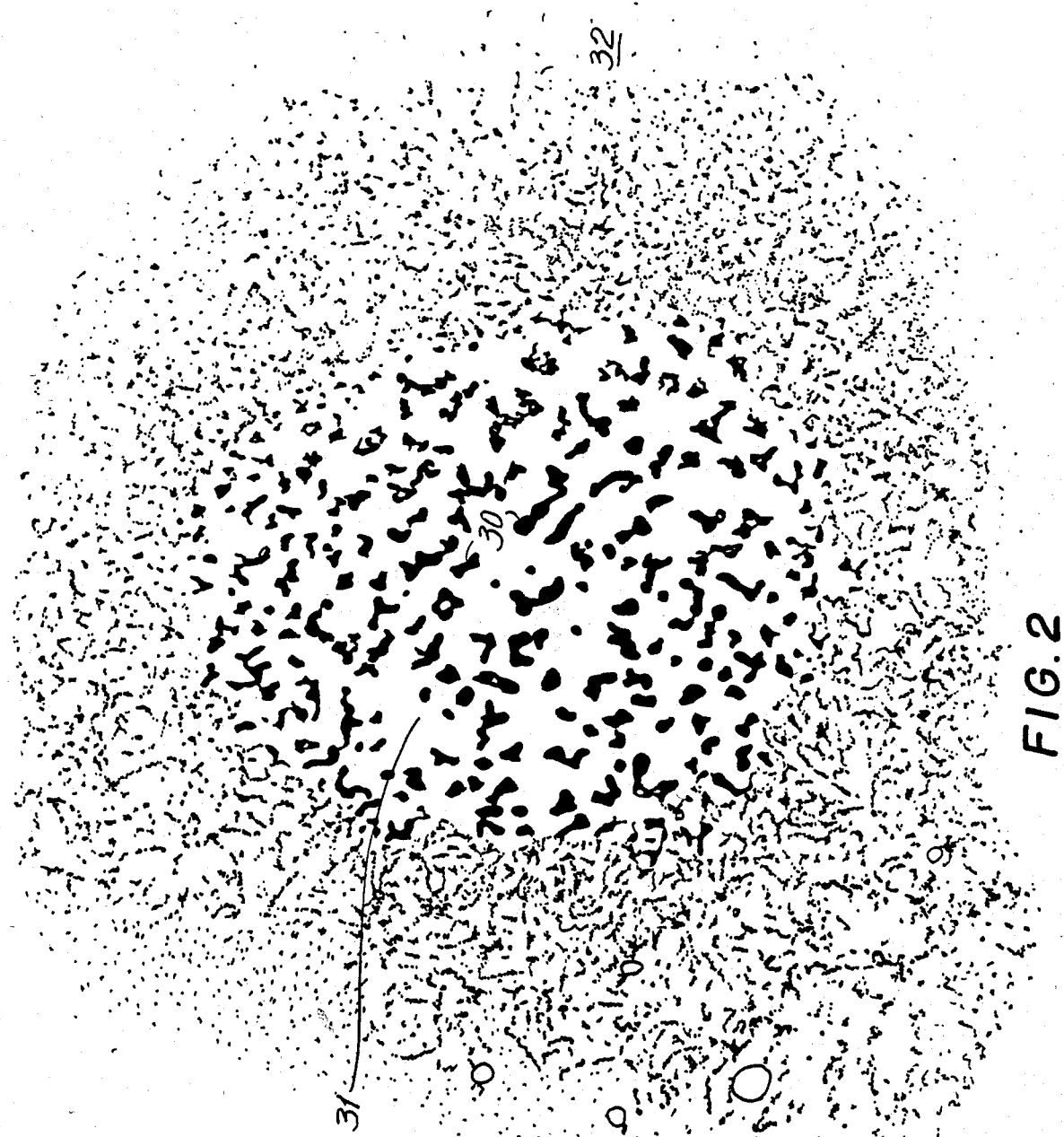

In order that the invention may be more clearly understood it will now be disclosed in greater detail with reference to the accompanying drawings, wherein:

FIG. 1 is a cross-sectional view of an optical recording structure in accordance with the invention; and FIG. 2 is an electron-beam photograph of a portion of the active layer of the recording structure.

One form of optical storage device, in accordance with the invention, as illustrated in the cross-sectional view of FIG. 1, is comprised of a substrate 10 of, for example, aluminum or a plastic material. The substrate 10 may have a thickness of about 0.075 inch and be in the form of a disk of 14-inch diameter. These parameters are of course not limiting to the present invention.

The surface of the substrate disk 10 conventionally has small imperfections, micro irregularities, tooling marks, polishing streaks, etc., which are undesirable for the optical properties of the recording media, and in order to remove these imperfections, a planarizing layer 11 is preferably provided on at least one surface of the substrate. The planarizing layer may have a thickness of, for example, 2 to 25 micrometers and may comprise an acrylic layer solvent coated by spin coating. The surface of this layer should have a micro roughness less than 5 nanometers, and may be aluminized for this purpose.

The planar active layer also serves to prevent corrosion of the substrate, as well as to provide a chemical barrier between residual substrate contamination and the three-layer structure of the phase layer, active layer and matrix layer described in the following paragraphs.

As one example, the planarizing layer has been comprised of Rohm and Haas Acryloid A-10. This material is a solvent base methyl-methacrylate thermoplastic resin in a Cellosolve acetate having a viscosity of 800 to 1200 cps (Brookfield 25 degrees C.), 30% +/−1% solid, a density of 8.6 lbs, per gallon and a glass transition temperature of the polymer of 105 degrees C. The Acryloid A-10 resin was dissolved in a solution of Cellosolve acetate and butyl acetate with a final solvent ratio of 9:1, Cellosolve acetate to butyl acetate. The Cellosolve acetate was urethane grade (boiling point of 156.2 degrees C.), and the butyl acetate was spectral grade (boiling point of 126.5 degrees C.). The butyl acetate may be substituted by Cellosolve acetate. The solution has a solid content of 22%, and a viscosity of 133 cps (Brookfield at 21 degrees C.), filtered to 0.2 micrometers.

The planarizing layer provides a base for the reflecting layer 12. The reflecting layer is preferably of aluminum, although copper or silver may be alternatively employed. A thickness of about 100 nanometers is preferred, although this dimension is not critical. It must be highly reflective at the read, write and coarse seek wavelengths employed, for example, 633, 830 and 780 nanometers reflectively. The reflectivity should be equal to or greater than 0.85 in air, at these wavelengths.

The reflective layer 12 is preferably formed by sputtering onto the planarizing layer, for example, employing a Leybold-Heraeus in-line vacuum deposition system.

It will of course be apparent that the invention herein is not limited to the above structure wherein the reflective layer is formed on a planarizing layer, and other suitable techniques for forming a reflective surface of the required planarity, supported by the substrate, may be employed.

The next three layers, defining a three-layer structure are comprised of a phase layer 13 on the reflective layer, an active layer 14 on the phase layer and a matrix layer 15 on the active layer. The phase layer and matrix layer may be of a plasma polymerized fluorocarbon with a fluorine to carbon atomic ratio of (for example only) 1.8. The active layer may be deposied by sputtering tellurium alloy "STC-68" ($Te_{65}$ $Se_{20}$ $As_5$ $Ni_{10}$). In response to a write beam (for example, a laser beam) the optical energy of the beam is dissipated as thermal energy in the active layer, whereby the active layer agglomerates within the fluorocarbon phase and matrix layer. This agglomeration affects the optical transmittance of the three-layer structure in accordance with the signal modulation of the write beam. At the read wavelength and coarse seek wavelengths the active layer absorbs energy to a different extent in the written and unwritten areas, to develop a reflective contrast.

The phase layer optically adjusts the absorption and reflectivity of the three-layer structure at the read, write and coarse seek wavelengths, the phase layer thereby having a tuned thickness to effect destructive interference at the active layer for beams of the read and coarse seek wavelengths, as a result as reflection of these beams at the reflective layer 12. The phase layer 13 also similarly isolates the active layer from the heat sinking effect of the highly conductive reflecting layer, thereby enabling the energy of the write beam to be effectively dissipated in the active layer. In addition, as discussed above the phase layer provides a matrix into which the active layer can be dispersed. The phase layer may have a thickness, for example, of 80 nanometers with an index of refraction of about 1.38.

The active layer is a thin layer having discrete island-like globules. The layer therefore has irregular or discontinuous upper and lower surface characteristics defined by the globular surfaces. The mass equivalent average thickness of the active layer is thus about 7 to 8 nanometers. The globules denote discrete particles of dimension averaging within the range of 1 to 8 nanometers. It must be stable chemically, optically and in atomic structure. It has an amorphous lattice structure, with a glass transition temperature greater than 80 degrees C. The agglomeration of the globules in response to the heat generated by the write beam is illustrated in the electron beam photograph of FIG. 2, wherein it is seen that the material of the active layer has agglomerated to form enlarged globules 30 interspersed with large transparent areas, in the generally circular region 31 that has been exposed to the write beam, the surrounding region 32 of the active layer remaining substantially reflective. (The globules are of course transparent to light waves, in view of their size, and can be analyzed only in radiation of smaller wavelength.) In this photograph the diameter of the exposed area 31 of the active layer was about one micron.

The matrix layer 15 may have a thickness of, for example, 270 nanometers.

The fluorocarbon phase layer and fluorocarbon matrix layer are preferably formed by plasma polymerization, and the active layer is formed by sputtering, for example, employing a Leybold-Heraeus in-line vacuum deposition system.

An adhesion layer 16 is provided on the matrix layer. The adhesion layer, in addition to providing the proper surface energy for the application of the outer defocusing layer, also provides adhesive coupling between the matrix layer and the defocusing layer. While the defocusing layer 17 may be applied directly to the matrix layer 15, it has been found that adequate bonding by such direct application is not achieved, for example, when the defocusing layer is of a material such as acrylic polymer. The defocusing layer must be adhered firmly to the storage structure, such that it will not loosen by the variable forces acting thereon, such as the centrifugal force caused by rotation of the disk, and similarly induced forces that may effect a gradual deterioration of adhering forces. The adhesion layer 16 thus serves to inhibit the eventual separation of the defocusing layer 17 from the matrix layer 15, in use. This adhesion layer is preferably comprised of a layer of aluminum from 1 to 10 nanometers thick, preferably about 2 nanometers thick. The adhesion layer 16 may be formed by sputtering aluminum, for example, employing a Leybold-Heraeus vacuum deposition system.

The outer layer 17 of the structure is a defocusing layer, which serves to optically defocus dirt and dust particles and the like which have come to rest thereon. The defocus effect prevents interference with the optical structures formed in the active layer, in writing and reading data, and in the optical seeking operations. The critical properties of the defocusing layer are that it be sufficiently thick to defocus dust particles that lie on the surface of the disk. In this sense, it is desirable that the layer be set to have, for example, a working thickness of about one micron, or 1000 nanometers. This selection must be balanced however in view of factors that suggest the desirability of a thinner defocusing layer, such as the difficulty of depositing an extremely thick layer with uniformity of thickness and optical integrity, and the rendering of the disk more vulnerable to film stress-induced warping from thicker films. In one embodiment of the invention, the defocusing layer was an acrylic polymer with a thickness of about 178 nanometers, composed of an acrylic polymer having a viscosity of $18+/-3$ cps (Brookfield, UL, 12 rpm, 25 degrees C.). Its surface tension was $27-/-3$ dyne/cm. The refractive index as a liquid was $1.455+/-0.005$, and as a solid $1.494+/-0.005$. The glass transition temperature was 56 degrees C. and the density was $1.06+/-0.001$ gm/cc (25 degrees C.). The shrinkage upon curing was 12%, and the water pickup was 0.5%. The material was prefiltered to 0.2 microns before use.

The dust defocusing layer may be applied by rotating the disk in a horizontal plane, at a speed of, for example, 20 rpm. The acrylic polymer is preferably applied to the surface of the adhesion layer by means of a nozzle controlled to move from a predetermined inner diameter position of the disk to a predetermined outer diameter position, for example, between an inner diameter position of about 7.6 inches and an outer diameter position of 13.945 inches on a disk of about 14-inch diameter. The rotation of the disk during the application of the acrylic polymer achieves a thickness uniformity of $+/-0.005$ inches in the active area of the disk, for example, between diameters of 8.66 inches and 13.84 inches. The micro roughness of this surface is no greater than 100 angstroms rms, and surface undulations having spatial wavelengths from 5 millimeters to 50 millimeters are less than 1,000 angstroms PP. No defect is permissible greater than 200 nanometers in size. Following deposition of acrylic polymer, the layer is cured in ultraviolet light for a time less than 60 seconds, the curing being effective before removal of the coated disk from the deposition apparatus. The uniformity of exposure of the layer to ultraviolet curing light must be better than 90 percent, since uniformity is needed not just for an even cure, but also so that any change induced in the media is uniform. In the above example, the intensity of the curing light at the disk surface must be 25 milliwatts per centimeter or greater, preferably with the spectral intensity concentrated around 360 millimeters. The intensity of infrared radiation during curing must be low, for example, less than 22 milliwatts per centimeter, since the dust defocusing layer may be damaged by infrared radiation prior to curing.

An optical storage structure as above described in the form of a disk of about 14-inch diameter, is adapted to be rotated at a rate of, for example, about 1300 rpm. Writing of data on the disk is effected by a laser beam, at the write frequency, with a diameter of $0.5+/-0.05$ nanometers, the beam having a write power equal to or less than 16 milliwatts. The reading photodetectors are adapted to read spot sizes of about 0.75 nanometers.

In copending application Ser. No. 499,666, Muchnik et al., filed May 31, 1983, assigned to the assignee of the present application, illustrations are provided for illustrating, at the submicroscopic level, the interface between the matrix layer, active layer and phase layer, showing that the discrete globules of the active layer are encapsulated between the fluorocarbon material of the matrix layer and phase layer. Said prior application points out that the mode by which the optical properties of the three layers are varied in response to heat from a laser beam is not known. It is believed at present, however, that the change of optical properties is effected by agglomeration of the materials rather than chemical reaction.

While the invention has been disclosed and described with reference to a single embodiment, it will be apparent that variations and modifications may be made therein, and it is therefore intended in the following claims to cover each such variation and modification as falls within the true spirit and scope of the invention.

What is claimed is:

1. A radiation recording structure for use in an information storage device having focused write and read radiation beams, said recording structure comprising:
    (a) a substrate supported reflective layer;
    (b) a three-layer structure on said reflected layer comprising a tuned phase layer, an active globular layer and a matrix layer, in that order, said matrix and phase layers being substantially transparent to said radiation beams;
    (c) a dust defocusing layer for defocusing the image of dust on said dust defocusing layer; and
    (d) an aluminum adhesion layer adhering said dust defocusing layer to said matrix layer, said adhesion layer being substantially transparent to said radiation beams.

2. The radiation recording structure of claim 1 wherein said adhesion layer is comprised of a layer of aluminum between 1 and 3 nanometers thick.

3. The radiation recording structure of claim 2 wherein said adhesion layer has a thickness of about 2 nanometers.

4. The radiation recording structure of claim 3 wherein said phase layer and matrix layer are of fluorocarbon material, and said active layer comprises globules of a tellurium, selenium and arsenic alloy.

5. In an optical recording structure having at least one optically recorded layer presenting regions of variable contrast to a focused radiation beam, and an acrylic polymer dust defocusing layer for defocusing the effect of particles lying on said dust defocusing layer on said recording layer; the improvement comprising an aluminum adhesion layer adhering said dust defocusing layer to said recording layer, said adhesion layer being selected to provide suitable surface energy for application and retention of said defocusing layer.

6. The recording structure of claim 5 wherein said recording layer comprises a fluorocarbon outer layer, and said adhesion layer comprises a layer of aluminum between 1 and 3 nanometers thick adhering said dust defocusing layer to said fluorocarbon layer.

7. The recording structure of claim 6 wherein said dust defocusing layer is comprised of an acrylic polymer.

8. The recording structure of claim 5 wherein said recording layer is supported on a substrate.

9. An optical recording structure for use in an information storage device having focused write and read radiation beams, said recording structure comprising:
    (a) a disk-shaped substrate for providing support for the recording structure;
    (b) a planarizing layer on said substrate for providing an optically flat surface;
    (c) a reflective layer deposited on said planarizing layer;
    (d) a three-layer structure comprised of a fluorocarbon phase layer on said reflective layer, an active layer on said phase layer, and a fluorocarbon matrix layer on said active layer, whereby said active layer is encapsulated between said phase layer and matrix layer, said active layer comprising globules of a tellurium, selenium and arsenic alloy;
    (e) a metallic aluminum adhesion layer on said matrix layer; and
    (f) a dust defocusing layer on said adhesion layer,
    said adhesion layer and dust defocusing layer being optically transparent to said read and write beams, said adhesion layer bonding said dust defocusing layer to said matrix layer.

* * * * *

UNITED STATES PATENT AND TRADEMARK OFFICE
CERTIFICATE OF CORRECTION

PATENT NO. : 4,600,682

DATED : July 15, 1986

INVENTOR(S) : Fred W. spong, et al

It is certified that error appears in the above-identified patent and that said Letters Patent is hereby corrected as shown below:

Column 4, line 16, change "27-" to --27+--.

Signed and Sealed this

Twenty-eighth Day of October, 1986

[SEAL]

*Attest:*

DONALD J. QUIGG

*Attesting Officer*     *Commissioner of Patents and Trademarks*